Patented Apr. 16, 1935

1,998,220

UNITED STATES PATENT OFFICE 1,998,220

CATALYST AND PROCESS FOR THE PRODUCTION OF OXYGENATED ORGANIC COMPOUNDS

Ralph Lyman Brown, Syracuse, N. Y., assignor to Atmospheric Nitrogen Corporation, New York, N. Y., a corporation of New York No Drawing. Application October 4, 1932, Serial No. 636,252

23 Claims. (Cl. 260—116)

This invention relates to the production of oxygenated organic compounds from an aliphatic alcohol and carbon monoxide in the presence of hydrogen and more particularly to catalysts active for promoting the reaction of an aliphatic alcohol and carbon monoxide in the presence of hydrogen. This application is a continuation in part of my copending application, Serial No. 545,850, filed June 20, 1931.

In the synthesis of organic compounds from aliphatic alcohols and carbon monoxide, for example, the production of acetic acid from methanol and carbon monoxide, the gaseous reaction mixture usually contains some hydrogen. The presence of this hydrogen may be due to one or more of several factors and may be a substantial proportion of the gaseous mixture. For example, the carbon monoxide of the gas mixture or the hydrocarbons (methane) formed as a side reaction may react to some extent with the water vapor usually in the reaction mixture and result in the formation of hydrogen. If water gas or the like is used as the carbon monoxide gas or if the gaseous reaction mixture obtained in the synthesis of methanol from carbon monoxide and hydrogen is used directly as the source of the methanol, in either case a substantial amount of hydrogen will be introduced into the acetic acid reaction mixture. The hydrogen thus introduced into or formed in the acetic acid process will be increased still further if the process is operated as a cyclic system with return of the unconverted gases to the catalyst after removal of the acetic acid. Due to these or other conditions, the hydrogen may comprise 10% to 40% of the mixture of carbon monoxide, methanol or other alcohol to be catalyzed for synthesis of acetic acid or other acid.

I have found that catalyst materials comprising tungsten and a component which is a catalyst for the water gas reaction

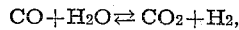

$$CO + H_2O \rightleftarrows CO_2 + H_2,$$

such as aluminum, titanium or copper are particularly adapted for the catalysis of mixtures of an aliphatic alcohol and carbon monoxide when such mixtures also contain hydrogen.

The following examples illustrate my invention in connection with hydrated tungsten oxide catalysts of the type described in my copending application Serial No. 636,251, filed October 4, 1932.

Example I.—To 4 liters of a boiling substantially saturated solution of para ammonium tungstate, containing 1 part of the tungstate for every 12.5 parts water, add with agitation 300 c. c. of concentrated nitric acid containing 70% HNO3. A nitric acid of this concentration has a specific gravity of 1.42. The solution is agitated and boiled for 15 minutes after the final addition of the acid. Separate the precipitate, which is a hydrated tungsten oxide, by filtration and impregnate it with a solution of aluminum, beryllium and bismuth nitrates, in amounts corresponding to the following composition expressed as oxides: WO3, 90 mols.; Al2O3, 10 mols.; BeO, 0.6 mol.; Bi2O3, 2.5 mols. Dry for 4 hours in an oven maintained at about 170° C. Under these conditions of drying the tungsten oxide retains its hydrated condition. Crush and compress into tablets.

Example II.—Prepare tungsten oxide by treating 4200 parts of a 5% solution of hexahydrated para ammonium tungstate with 425 parts of 70% nitric acid at about 100° C. Separate the precipitate of hydrated tungsten oxide, and add to the wet oxide precipitate nitrates of titanium, bismuth and beryllium in amounts corresponding to the following composition expressed as oxides: oxide of tungsten, WO3, 90 mols.; titanium oxide, 10 mols.; oxide of bismuth, Bi²O3, 2.5 mols.; and oxide of beryllium, BeO, 0.6 mol. Dry the mixture and compress into pill form as in Example I.

Example III.—Prepare tungsten oxide as in Example II. Impregnate the wet oxide precipitate with a solution of copper and beryllium nitrates in amounts corresponding to the following composition expressed as oxides: oxide of tungsten, WO3, 90 mols.; oxide of copper, CuO, 10 mols.; oxide of beryllium, BeO, 0.6 mol. Dry the resulting mixture at about 165° C. (five hours is sufficient), then crush and compress into tablet form.

Example IV.—A catalyst prepared for example as described in Example I, is placed in a converter capable of withstanding the temperature and pressure conditions of operation. A mixture in the proportions of 6.8 mols. CO, 4.6 mols. hydrogen, 1 mol. methanol and 4 mols. water under a pressure of 300 atmospheres and space velocity of 4000 is passed through the converter, in contact with the catalyst mass at a temperature of about 385° C. The gaseous mixture leaving the converter is cooled to about 20° C. The condensate containing acetic acid, water, methyl acetate and unchanged methanol, together with small amounts of methyl formate and formic acid, may be distilled to recover the free acetic acid and its methyl ester. The methanol fraction of the condensate may be returned to the process together with the residual uncondensed gases containing unreacted carbon monoxide and in some cases a certain amount of dimethyl ether, suitable adjustment being made by introduction of fresh gases to maintain the desired relationship between the methanol, carbon monoxide and water vapor and by bleeding to prevent excessive accumulation of inert constituents particularly methane.

The aqueous portion of the condensate may also be returned in amount sufficient to maintain the desired water content of the reaction gases in which case the separation of acetic acid therefrom need not be so complete.

*Example V.*—A catalyst prepared for example as described in Example I, is placed in a converter capable of withstanding the temperature and pressure conditions of operation. A mixture in the proportions of 9.1 mols. CO, 2.3 mols. $H_2$, 1.0 mol. methanol, and 4 mols. of water under a pressure of 680 atmospheres and space velocity of 16,000, is passed through the converter in contact with the catalyst mass at a temperature of about 395° C. The gaseous mixture leaving the converter is cooled to about 20° C. The condensate containing acetic acid, water, methyl acetate and unchanged methanol, together with small amounts of methyl formate and formic acid, may be distilled to recover the free acetic acid and its methyl ester. The methanol fraction of the condensate may be returned to the process together with the residual uncondensed gases containing unreacted carbon monoxide and in some cases a certain amount of dimethyl ether, suitable adjustment being made by introduction of fresh gases to maintain the desired relationship between the methanol, carbon monoxide and water vapor and by bleeding to prevent excessive accumulation of inert constituents particularly methane.

The aqueous portion of the condensate may also be returned in amount sufficient to maintain the desired water content of the reaction gases, in which case the separation of acetic acid therefrom need not be so complete.

*Example VI.*—A tungsten catalyst prepared for example as described in Example III is placed in a converter capable of withstanding high pressure and lined with silver. A methanol-carbon monoxide mixture containing 5.7 mols. CO, about an equal quantity of hydrogen, and 4 mols. water per mol. methanol under a pressure of 200 atmospheres and space velocity of 4,000, is passed through the converter in contact with the catalyst mass at a temperature of about 375° C. The gaseous mixture leaving the converter may be treated as in Example IV.

I claim:

1. As a new composition active to catalyze the reaction of an aliphatic alcohol and carbon monoxide in the presence of hydrogen a multi-component catalyst, one of said components, constituting the major portion of the catalytically active portion of the catalyst, being tungsten oxide in which the state of oxidation of the tungsten is not less than that represented by $W_2O_5$ and another of said components being a material which is a catalyst for the reaction $CO+H_2O \rightarrow CO_2+H_2$.

2. As a new composition active to catalyze the reaction of an aliphatic alcohol and carbon monoxide in the presence of hydrogen a multi-component catalyst, one of said components, constituting the major portion of the catalytically active portion of the catalyst, being tunsten oxide in which the state of oxidation of the tungsten is not less than that represented by $W_2O_5$ and another of said components being an element from the group aluminum, titanium and copper.

3. As a new composition active to catalyze the reaction of an aliphatic alcohol and carbon monoxide in the presence of hydrogen a multi-component catalyst, one of said components, constituting the major portion of the catalytically active portion of the catalyst, being tungsten oxide in which the state of oxidation of the tungsten is not less than that represented by $W_2O_5$, another of said components being an element from the group aluminum, titanium and copper, and still another of said components being beryllium.

4. As a new composition active to catalyze the reaction of an aliphatic alcohol and carbon monoxide in the presence of hydrogen a multi-component catalyst, one of said components, constituting the major portion of the catalytically active portion of the catalyst, being tungsten oxide in which the state of oxidation of the tungsten is not less than that represented by $W_2O_5$ and others of said components being aluminum, beryllium and bismuth.

5. As a new composition active to catalyze the reaction of an aliphatic alcohol and carbon monoxide in the presence of hydrogen a multi-component catalyst, one of said components being hydrated tungsten oxide and another of said components being a material which is a catalyst for the reaction of $CO+H_2O \rightarrow CO_2+H_2$.

6. As a new composition active to catalyze the reaction of an aliphatic alcohol and carbon monoxide in the presence of hydrogen a multi-component catalyst, one of said components being hydrated tungsten oxide and another of said components being an element from the group aluminum, titanium and copper.

7. As a new composition active to catalyze the reaction of an aliphatic alcohol and carbon monoxide in the presence of hydrogen a multi-component catalyst, one of said components being hydrated tungsten oxide, another of said components being an element from the group aluminum, titanium and copper, and still another of said components being beryllium.

8. As a new composition active to catalyze the reaction of an aliphatic alcohol and carbon monoxide in the presence of hydrogen a multi-component catalyst, one of said components being hydrated tungsten oxide and others of said components being aluminum, beryllium and bismuth.

9. A process for the production of oxygenated organic compounds which comprises reacting an aliphatic alcohol and carbon monoxide in the presence of hydrogen and in contact with the catalyst defined in claim 1.

10. A process for the production of oxygenated organic compounds which comprises reacting an aliphatic alcohol and carbon monoxide in the presence of hydrogen and in contact with the catalyst defined in claim 2.

11. A process for the production of oxygenated organic compounds which comprises reacting an aliphatic alcohol and carbon monoxide in the presence of hydrogen and in contact with the catalyst defined in claim 3.

12. A process for the production of oxygenated organic compounds which comprises reacting an aliphatic alcohol and carbon monoxide in the presence of hydrogen and in contact with the catalyst defined in claim 4.

13. A process for the production of oxygenated organic compounds which comprises reacting an aliphatic alcohol and carbon monoxide in the presence of hydrogen and in contact with the catalyst defined in claim 5.

14. A process for the production of oxygenated organic compounds which comprises reacting an aliphatic alcohol and carbon monoxide in the presence of hydrogen and in contact with the catalyst defined in claim 6.

15. A process for the production of oxygenated organic compounds which comprises reacting an aliphatic alcohol and carbon monoxide in the presence of hydrogen and in contact with the catalyst defined in claim 7.

16. A process for the production of oxygenated organic compounds which comprises reacting an aliphatic alcohol and carbon monoxide in the presence of hydrogen and in contact with the catalyst defined in claim 8.

17. A process for the production of acetic acid which comprises reacting methanol and carbon monoxide in the presence of hydrogen and in contact with the catalyst defined in claim 1.

18. A process for the production of acetic acid which comprises reacting methanol and carbon monoxide in the presence of hydrogen and in contact with the catalyst defined in claim 5.

19. A process for the production of acetic acid which comprises reacting methanol and carbon monoxide in the presence of hydrogen and in contact with the catalyst defined in claim 7.

20. As a new composition active to catalyze the reaction of an aliphatic alcohol and carbon monoxide in the presence of hydrogen a multi-component catalyst, one of said components, constituting the major portion of the catalytically active portion of the catalyst, being tungsten oxide in which the state of oxidation of the tungsten is not less than that represented by $W_2O_5$ and another of said components being an oxide of an element from the group aluminum, titanium and copper.

21. As a new composition active to catalyze the reaction of an aliphatic alcohol and carbon monoxide in the presence of hydrogen a multi-component catalyst, one of said components, constituting the major portion of the catalytically active portion of the catalyst, being tungsten oxide in which the state of oxidation of the tungsten is not less than that represented by $W_2O_5$, another of said components being an oxide of an element from the group aluminum, titanium and copper, and still another of said components being beryllium oxide.

22. A process for the production of oxygenated organic compounds which comprises reacting an aliphatic alcohol and carbon monoxide in the presence of hydrogen and in contact with the catalyst defined in claim 20.

23. A process for the production of oxygenated organic compounds which comprises reacting an aliphatic alcohol and carbon monoxide in the presence of hydrogen and in contact with the catalyst defined in claim 21.

RALPH LYMAN BROWN.